(12) United States Patent
Miyamoto et al.

(10) Patent No.: US 7,929,402 B2
(45) Date of Patent: Apr. 19, 2011

(54) OPTICAL PICKUP, OPTICAL INFORMATION RECORDING DEVICE, OPTICAL INFORMATION RECORDING METHOD, OPTICAL INFORMATION REPRODUCTION DEVICE, OPTICAL INFORMATION REPRODUCTION METHOD AND OPTICAL INFORMATION RECORDING MEDIUM

(75) Inventors: Hirotaka Miyamoto, Kanagawa (JP); Jingcheng Yuan, Kanagawa (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 12/214,122

(22) Filed: Jun. 17, 2008

(65) Prior Publication Data
US 2009/0003183 A1    Jan. 1, 2009

(30) Foreign Application Priority Data
Jun. 27, 2007    (JP) .................... 2007-168992

(51) Int. Cl.
*G11B 7/00* (2006.01)
(52) U.S. Cl. .................. 369/112.24; 369/44.37
(58) Field of Classification Search ............... None
See application file for complete search history.

(56) References Cited

U.S. PATENT DOCUMENTS

| 5,024,927 A | * | 6/1991 | Yamada et al. | 430/270.14 |
| 6,574,174 B1 | * | 6/2003 | Amble et al. | 369/44.26 |
| 6,738,324 B2 | * | 5/2004 | Saimi et al. | 369/44.37 |

FOREIGN PATENT DOCUMENTS

| JP | 04-301226 A | 10/1992 |
| JP | 07-021565 A | 1/1995 |
| JP | 2001-093162 A | 4/2001 |
| JP | 2001-307344 A | 11/2001 |
| JP | 2006-012244 A | 1/2006 |
| JP | 2006-092657 A | 4/2006 |
| JP | 2006-107668 A | 4/2006 |

* cited by examiner

*Primary Examiner* — Joseph Haley
(74) *Attorney, Agent, or Firm* — Wolf, Greenfield & Sacks, P.C.

(57) ABSTRACT

An optical pickup includes: an objective lens that collects a first beam and a second beam and emits the first and second beam toward an optical information recording medium on which information can be recorded as a recording mark as a result of being exposed to the first beam; a section that drives the objective lens to focus the second beam on a reflection layer formed on the optical information recording medium, the reflection layer at least partly reflecting the second beam; and a section that changes the convergence state of the first beam to position a focal point of the first beam a distance away from a focal point of the second beam in the direction of depth in order to place the focal point of the first beam at a target depth.

18 Claims, 12 Drawing Sheets

OPTICAL PICKUP, OPTICAL INFORMATION RECORDING DEVICE, OPTICAL INFORMATION RECORDING METHOD, OPTICAL INFORMATION REPRODUCTION DEVICE, OPTICAL INFORMATION REPRODUCTION METHOD AND OPTICAL INFORMATION RECORDING MEDIUM

CROSS REFERENCES TO RELATED APPLICATIONS

The present invention contains subject matter related to Japanese Patent Application JP2007-168992 filed in the Japanese Patent Office on Jun. 27, 2007, the entire contents of which being incorporated herein by reference.

BACKGROUND OF THE INVENTION

1. Field of the Invention

The present invention relates to an optical pickup, optical information recording device, optical information recording method, optical information reproduction device, optical information reproduction method and optical information recording medium, and is preferably applied to an optical information recording and reproducing device that records information on a recording medium by using an optical beam and reproduces the information from the recording medium by using an optical beam, for example.

2. Description of the Related Art

As an optical information recording and reproducing device, an optical disc device is popular: The optical disc device uses a disc-shaped optical disc as an information recording medium, which includes Compact Disc (CD), Digital Versatile Disc (DVD) and "Blu-Ray Disc (Registered Trademark: also referred to as 'BD')."

The optical disc device is designed to record on an optical disc various types of information, such as various types of content (like music content and video content) and various types of data for computers. In recent years, the amount of information is increasing as the technique of high-definition images develops and the quality of sound improves. Since the number of contents to be recorded on one optical disc is increasing, the capacity of the optical disc may need to increase.

A method to increase the capacity of an optical disc is proposed in Jpn. Pat. Laid-open Publication No. 2006-78834 (FIG. 1): It employs a technique of making two optical beams together and forms a hologram to record information.

SUMMARY OF THE INVENTION

However, since the rotating optical disc moves up and down, the above optical disc device may need an advanced control system to focus two optical beams to a point where information will be recorded. If it employs such an advanced control system, the structure becomes complicated and thereby makes it difficult to ensure the stable reading and recording of information.

The present invention has been made in view of the above points and is intended to provide an optical pickup, optical information recording device, optical information recording method, optical information reproduction device and optical information reproduction method capable of the stable reading and recording of information with simple structure, and an optical information recording medium capable of the stable reading and recording of information.

In one aspect of the present invention, an optical pickup includes: an objective lens that collects a first beam and a second beam whose wavelength is different from the first beam and emits the first and second beam toward an optical information recording medium on which information can be recorded as a recording mark as a result of being exposed to the first beam whose intensity is greater than or equal to a predetermined level; an objective lens drive section that drives the objective lens to focus the second beam on a reflection layer formed on the optical information recording medium, the reflection layer at least partly reflecting the second beam; and a focal point shifting section that changes the convergence state of the first beam to position a focal point of the first beam a certain distance away from a focal point of the second beam in the direction of depth along which the objective lens moves close to or away from the optical information recording medium in order to place the focal point of the first beam at a target depth that should be exposed to the first beam.

In that manner, by emitting the first beam, information can be recorded and reproduced from the optical information recording medium. Therefore, there is no need to have two optical paths for two beams anymore. This reduces the number of optical components. In addition, since a high level of control is not required to focus the two beams at the same time, the number of optical components related to such control processes can be reduced.

In another aspect of the present invention, an optical information recording device and an optical information recording method include the processes of: using an objective lens to collect a first beam and a second beam whose wavelength is different from the first beam and emit the first and second beam toward an optical information recording medium on which information can be recorded as a recording mark as a result of being exposed to the first beam whose intensity is greater than or equal to a predetermined level; driving the objective lens to focus the second beam on a reflection layer formed on the optical information recording medium, the reflection layer at least partly reflecting the second beam; and changing the convergence state of the first beam to position a focal point of the first beam a certain distance away from a focal point of the second beam in the direction of depth along which the objective lens moves close to or away from the optical information recording medium in order to place the focal point of the first beam at a target depth that should be exposed to the first beam.

In that manner, by emitting the first beam, the recording mark can be formed. Therefore, there is no need to have two optical paths for two beams anymore. This reduces the number of optical components. In addition, since a high level of control is not required to focus the two beams at the same time, the number of optical components related to such control processes can be reduced.

In another aspect of the present invention, an optical information reproduction device and an optical information reproduction method include the processes of: using an objective lens to collect a first beam and a second beam whose wavelength is different from the first beam and emit the first and second beam toward an optical information recording medium on which information can be recorded as a recording mark as a result of being exposed to the first beam whose intensity is greater than or equal to a predetermined level; driving the objective lens to focus the second beam on a reflection layer formed on the optical information recording medium, the reflection layer at least partly reflecting the second beam; changing the convergence state of the first beam to position a focal point of the first beam a certain distance away from a focal point of the second beam in the direction of depth along which the objective lens moves close to or away from the optical information recording medium in order to place the focal point of the first beam at a target depth that should be exposed to the first beam; and receiving the reflection of the first beam from the recording mark.

In that manner, information can be reproduced from the optical information recording medium based on the reflection of the first beam emitted. Therefore, there is no need to have two optical paths for two beams anymore. This reduces the number of optical components. In addition, since a high level of control is not required to focus the two beams at the same time, the number of optical components related to such control processes can be reduced.

In another aspect of the present invention, an optical information recording medium includes: a recording layer made by exposing a photo-reactive uncured resin containing a organometallic compound to a predetermined initialization beam in photo-reaction by which the uncured resin is cured, the recording layer forming, when information is recorded, a recording mark after the organometallic compound changes in quality due to an increase in temperature around the focal point of a predetermined recording beam collected, while allowing information to be reproduced from a returning beam generated as a result of being exposed to a predetermined reading beam; and a reflection layer that at least partly reflects a servo beam whose wavelength is different from the recording beam, the servo beam emitted for positioning the recording beam at a certain position on the recording layer.

Therefore, by emitting the beam, the record mark can be formed on the recording layer. In addition, by using the servo beam, the position of the recording mark in the direction of depth with respect to the reflection layer can be determined.

According to an embodiment of the present invention, by emitting the first beam, information can be recorded and reproduced from the optical information recording medium. Therefore, there is no need to have two optical paths for two beams anymore. This reduces the number of optical components. In addition, since a high level of control is not required to focus the two beams at the same time, the number of optical components related to such control processes can be reduced.
Thus, the optical pickup is capable of the stable reading and recording of information with simple structure.

Moreover, by emitting the first beam, the recording mark can be formed. Therefore, there is no need to have two optical paths for two beams anymore. This reduces the number of optical components. In addition, since a high level of control is not required to focus the two beams at the same time, the number of optical components related to such control processes can be reduced. Thus, the optical information recording device and the optical information recording method are capable of the stable reading and recording of information with simple configuration.

Furthermore, information can be reproduced from the optical information recording medium based on the reflection of the first beam emitted. Therefore, there is no need to have two optical paths for two beams anymore. This reduces the number of optical components. In addition, since a high level of control is not required to focus the two beams at the same time, the number of optical components related to such control processes can be reduced. Thus, the optical information reproduction device and the optical information reproduction method are capable of the stable reading and recording of information with simple configuration.

Furthermore, by emitting the beam, the record mark can be formed on the recording layer. In addition, by using the servo beam, the position of the recording mark in the direction of depth with respect to the reflection layer can be determined. Thus, the optical information recording medium allows the stable reading and recording of information.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

Figure 1:
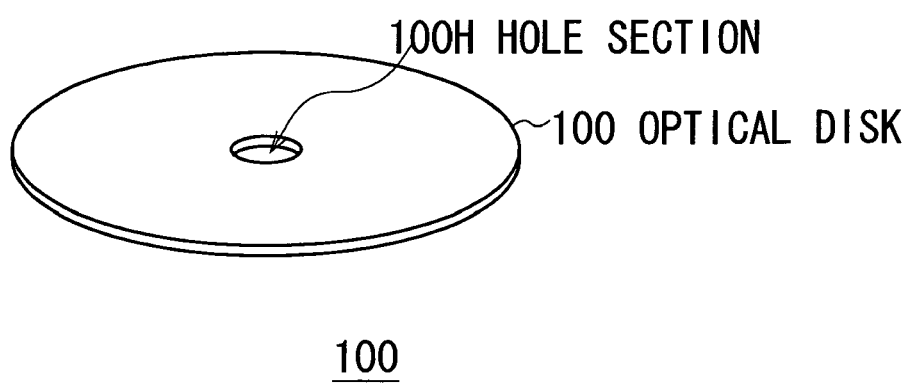
FIG. 1 is a schematic diagram of an optical disc.

An embodiment of the present invention will be described in detail with reference to the accompanying drawings.
(1) Configuration of Optical Disc
(1-1) Layer Structure of Optical Disc The following describes an optical disc 100, which is used as an optical information recording medium in this embodiment of the present invention. FIG. 1 is an appearance diagram. The optical disc 100 is a disc-shaped disc with a diameter of approximately 120 mm, similar to CD, DVD and BD. A hole section 100H is formed at the center of the optical disc 100.

Figure 2:
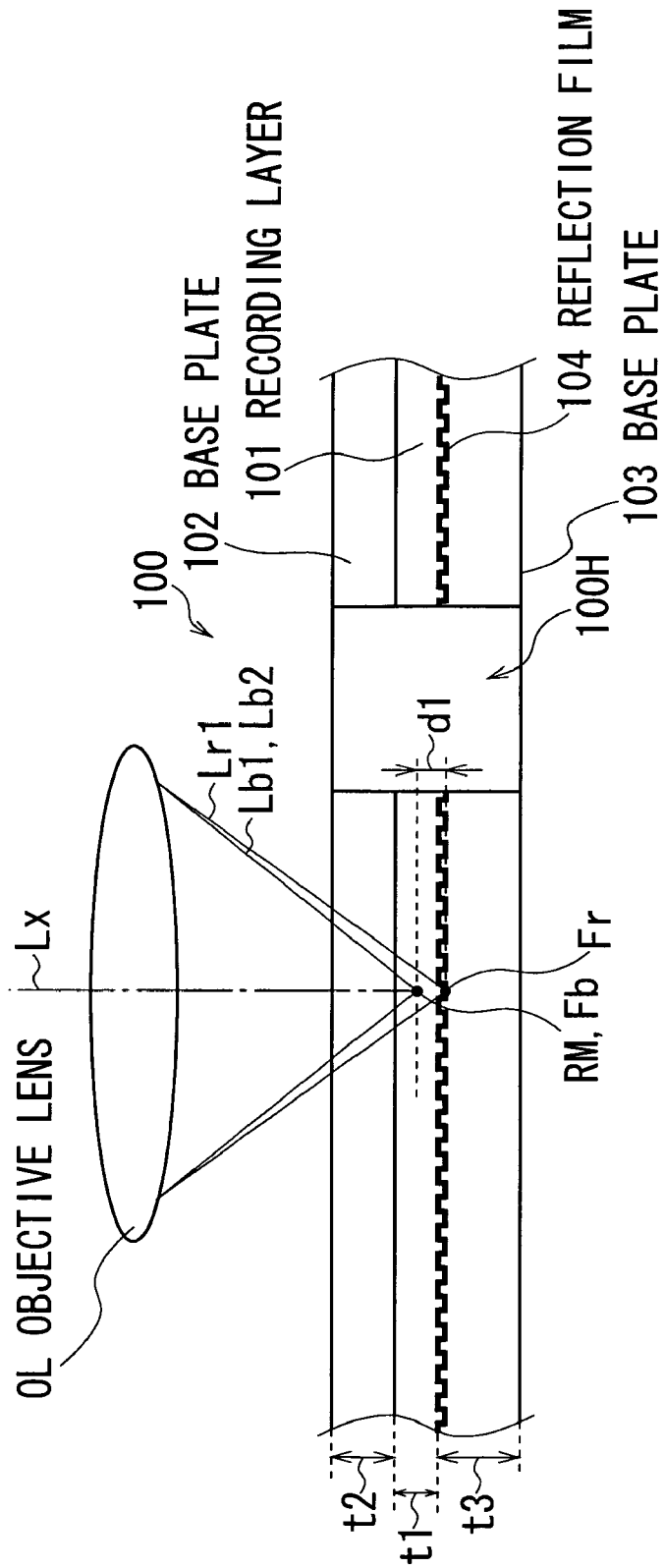
FIG. 2 is a schematic diagram illustrating the internal configuration of an optical disc.

FIG. 2 is a cross-section diagram. The optical disc 100 includes a recording layer 101 in the middle of the disc 100. The recording layer 101 on which information is recorded is sandwiched between base plates 102 and 103.

Incidentally, the thickness t1 of the recording layer 101 is about 0.3 mm. The thickness t2 and t3 of the base plates 102 and 103 are the same, around 0.6 mm.

The base plates 102 and 103 are made from materials such as polycarbonate or glass. Each of the base plates 102 and 103 allows light to pass through from one surface to the other surface with a high transmission rate. Moreover, the base plates 102 and 103 have some level of strength to protect the recording layer 101. By the way, the base plates 102 and 103 have an antireflection coating on their surfaces, preventing unwanted reflections.

In addition, the optical disc 100 has a reflection film 104 as a reflection layer at the boundary between the recording layer 101 and the base plate 103. The reflection film 104 is a dielectric multilayer or the like, and reflects both a blue optical beam Lb1, which is a blue laser beam with a wavelength of 405 nm, and a red optical beam Lr1, which is a read laser beam with a wavelength of 660 nm.

On the reflection film 104, a pre-groove for tracking servo is formed. More specifically, spiral tracks are formed by lands and grooves in a similar way to that of BD-R (Recordable). The recording segments of the tracks are associated with serial-number addresses, making it possible to identify a track from the address to record or reproduce information therefrom.

Instead of the pre-groove, a pit or the like may be formed on the reflection film 104 (at the boundary between the recording layer 101 and the base plate 103). Alternatively, the combination of the pre-groove, the pits and the like may be applied.

If the red optical beam Lr1 enters from the base plate 102, the reflection 104 reflects it toward the base plate 102. The reflected optical beam will be referred to as "red optical beam Lr2", hereinafter.

The red optical beam Lr2 is expected to be used for position control of an objective lens OL of, for example, an optical disc device (i.e. focus control and tracking control) in order to lead the red-beam focal point Fr of the red optical beam Lr1 collected by a predetermined objective lens OL to a target track.

In reality, during the process of recording information on the optical disc 100, as shown in FIG. 2, the position of the objective lens OL is controlled to collect the red optical beam Lr, which is then focused on a target track on the reflection film 104.

On the other hand, the blue optical beam Lb1 that shares an optical axis LX with the red optical beam Lr1 is collected by the objective lens OL and passes through the base plate 102. And then the blue optical beam Lb1 is focused on a point inside the recording layer 101, which corresponds to the target track. At this time, the blue-beam focal point Fb of the blue optical beam Lb and the red-beam focal point Fr are on the same optical axis Lx, and the blue-beam focal point Fb is closer to the objective lens OL than is the red-beam focal point Fr.

If the blue optical beam Lb1 is a recording blue optical beam Lb1$w$ that is used for a recording process, a recording mark RM is formed around a point to which a predetermined strength of the recording blue optical beam Lb1$w$ was applied inside the recording layer 101 (i.e. around the blue-beam focal point Fb). If the wavelength $\lambda$ of the blue optical beam Lb1 is 405 nm, the numerical aperture NA of the optical lens OL is 0.5 and the refractive index n of the objective lens OL is 1.5, the diameter RMr and height RMh of the recording mark RM are approximately 1 μm and 10 μm, respectively.

Figure 3A:
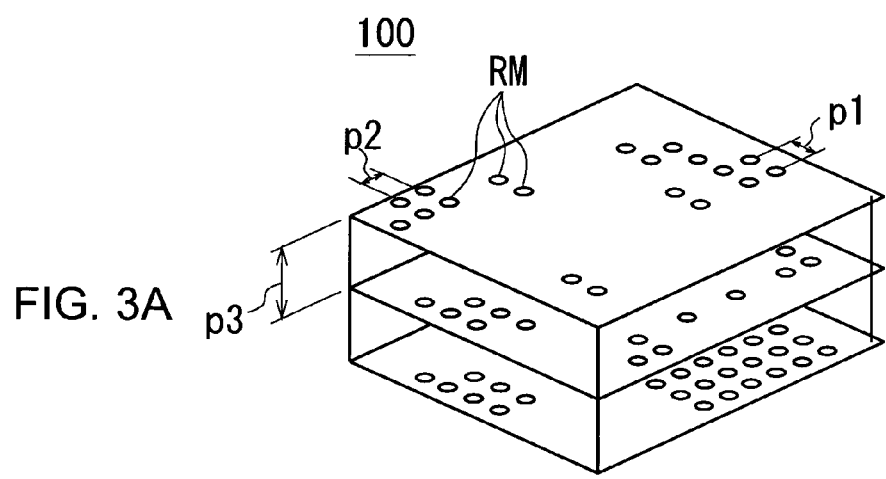
FIGS. 3A and 3B are schematic diagrams illustrating how to form a recording mark.
Figure 3B:
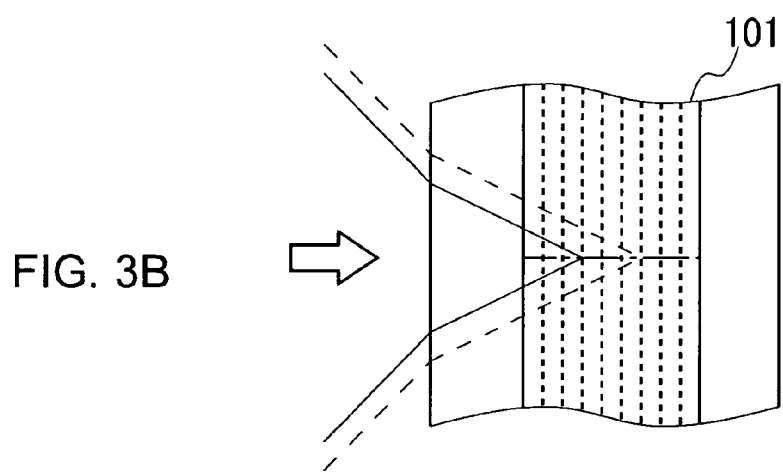

Furthermore, the optical disc 100 is designed such that the thickness t1 of the recording surface 101 (=0.3 mm) is substantially greater than the height RMh of the recording mark RM. The recording marks RM are recorded inside the recording layer 101 of the optical disc 100 as shown in FIGS. 3A and 3B, and the distances (or depths) between the recording marks RM and the reflection film 104 are different. A plurality of mark recording layers is piled up in the direction of the thickness of the optical disc 100. In this manner, multilayer recording is performed.

In this case, inside the recording layer 101 of the optical disc 100, the depth of the blue-beam focal point Fb of the recording blue optical beam Lb1$w$ is adjusted to change the depth of the recording mark RM. If the mutual interference between the recording marks RM and the like are taken into consideration and the distance p3 between the mark recording layers is set to around 15 μm, about 20 mark recording layers can be created inside the recording layer 101. By the way, the distance p3 may be set to other values, as long as the mutual interference between the recording marks RM and the like are taken into consideration.

On the other hand, when information is reproduced from the optical disc 100, the position of the objective lens OL is controlled in a similar way to when information is recorded: The red optical beam Lr1 is collected by the objective lens OL and then focused on a target track on the reflection film 104.

Moreover, in the optical disc 100, the blue-beam focal point Fb of a reading blue optical beam Lb1$r$ collected by the same objective lens OL is positioned above the target track, at a location (referred to as "target mark position," hereinafter) that is closer to the objective lens OL than is the red-beam focal point Fr and that is at a target depth in the recording layer 101.

Since the recording mark RM's refractive index is different from the surroundings, the recording mark RM reflects the reading blue optical beam Lb1$r$. This produces a blue optical beam Lb2 from the recording mark RM at the target mark position.

In this manner, when information is recorded on the optical disc 100, the red optical beam Lr1 is used for position control while the recording blue optical beam Lb1$w$ is used for recording. Therefore, inside the recording layer 101, the blue-beam focal point Fb is positioned above the target track of the reflection film 104 and at a target depth, or a target mark position, and thereby produces the recording mark RM thereon as the information.

Moreover, when the recorded information is reproduced from the optical disc 100, the red optical beam Lr1 is used for position control while the reading blue optical beam Lb1$r$ is used for reading. Therefore, from the recording mark RM formed at the target mark position where the blue-beam focal point Fb is positioned, the blue optical beam Lb2 is produced.

(1-2) Configuration of Recording Layer The following describes the configuration of the above recording layer 101.

Figure 4:
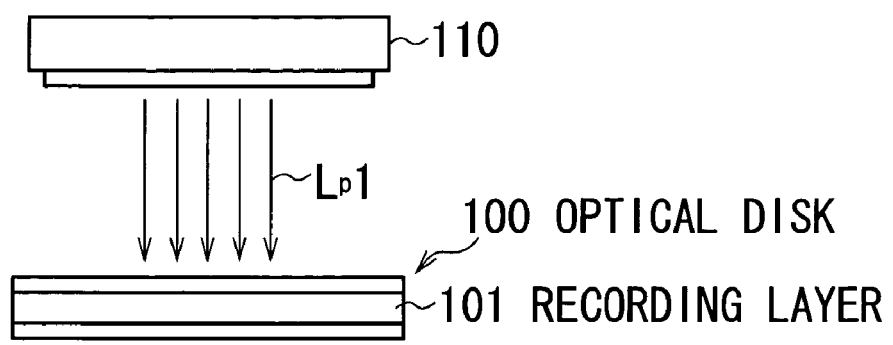
FIG. 4 is a schematic diagram illustrating how to initialize an optical disc.

The recording layer 101 is made from photopolymerizable photopolymer. It is produced by sandwiching an uncured resin 101$a$ (which is evenly-dispersed monomer, photopolymerization initiator or the like) between the base plates 102 and 103, and emitting, as shown in FIG. 4, from an initialization light source 110 (such as a high-pressure mercury-vapor lamp, a high intensity discharge lamp, a solid laser and a semiconductor laser) an initialization beam Lp1 to polymerize the uncured resin 101$a$.

The uncured resin 101$a$ is for example made from a free-radical-polymerizable compound and a photopolymerization initiator, or a cationic polymerizable compound and a cationic photopolymerization initiator. Out of these photopolymerizable resins, photocrosslinkable resins and photopolymerization initiators, specifically, the photopolymerization initiators are appropriately selected to make photopolymerization occur at desired wavelengths.

Moreover, the uncured resin 101$a$ includes either a small amount of organometallic or inorganometallic compound, or both of them. Emitting the initialization beam Lp1 causes either photopolymerization or photocrosslinking, or both of them.

In this manner, the optical disc 100 is produced such that it becomes thin and transmits light therethrough. The initialization process causes polymerization or crosslinking, or both of them. Moreover, the recording layer 101 includes a small amount of organometallic compound.

In the recording layer 101, during the recording process, when more than a predetermined intensity of the blue optical beam Lb1 is focused on the target mark position inside the recording layer 101, the recording mark RM is produced, because it is considered that the temperature locally rises as a result of focusing the blue optical beam Lb1 inside the recording layer 101 and therefore the organometallic compound thermally changes, separating out or agglutinating metal compounds, such as fluoride or oxide, or pure metal.

Accordingly, it is assumed that, because part of the resin including organometallic compound is locally heated up due to the focusing of the recording blue optical beam Lb1w and thermally changes, its refractive index changes and therefore its reflectance improves.

In reality, the uncured resin 101a is for example produced by mixing and degassing the following materials under the darkroom environment: acrylic acid ester monomer (p-cumylphenol ethylene oxide acryl ester) and urethane bifunctional acrylate oligomer with a weight ratio of 40:60; and an organometallic compound with the oligomer's weight ratio of 2%, or a photopolymerization initiator (Bis (eta 2,4-cyclopentadien-1-yl) Bis [2,6-difluoro-3-(1H-pyrrol-1-yl) phenyl]titanium (Irg-784 by Ciba Specialty Chemicals Inc.), which is also referred to as "Irg-784."

The recording layer 101 is produced in the following manner: The uncured resin 101a is put across the base plate 102, and then the recording layer 101 is sandwiched by this base plate 102 and the base plate 103 on which the reflection film 104 is formed; and the initialization beam Lp1 with a wavelength of 365 nm and a power density of 30 mW/cm$^2$, emitted from the initialization light source 110 (a high-pressure mercury-vapor lamp) for 60 minutes, causes photo-curing.

During the initialization process, the entire area of the recording layer 101 is exposed to either photopolymerization or photocrosslinking, or both of them. As a result, it is initialized (pre-cure). As a result, compared to before the emitting of the initialization beam, the refractive indexes change overall. Incidentally, after photo-curing, the recording layer 101 becomes substantially transparent, capable of transmitting the emitted beam therethrough at high rate.

Accordingly, inside the recording layer 101, the temperature rises around the target position where the recording blue optical beam Lb1w is focused on. This produces the recording mark RM whose reflectance is higher than the surroundings. In this manner, information is recorded. As a result, if the reading blue optical beam Lb1r is emitted toward the recording mark RM, the strong brightness of the blue optical beam Lb2 can be detected. Incidentally, the recording mark RM is substantially not visible.

On the other hand, if the reading blue optical beam Lb1r is emitted toward a portion where the recording mark RM is not recorded (i.e. unrecorded portion), the subtle blue optical beam Lb2 is detected. That is, when an optical disc device 20 reproduces information from the optical disc 100, the intensity of the blue optical beam Lb2 detected varies depending on whether the recording mark RM exists.

This means that, if it is defined that the recording mark RM means a symbol "0" or "1", information can be recorded on the optical disc 100. When reproducing the information, it can be accurately detected whether the recording mark RM is recorded at the target position, or whether a symbol "0" or "1" is recorded as information.

In this manner, the optical disc device 20 uses the optical disc 100. The optical disc device 20 focuses the recording blue optical beam Lb1w on the recording layer 101, which includes organometallic compounds and is previously photo-cured, to heat it up. This separates out metal compounds or pure metal and forms the recording mark RM. Moreover, the optical disc device 20 emits the reading blue optical beam Lb1r toward the recording mark RM and detects the strong brightness of the blue optical beam Lb2. In this manner, it reproduces information.

(2) Configuration of Optical Disc Device

Figure 5:
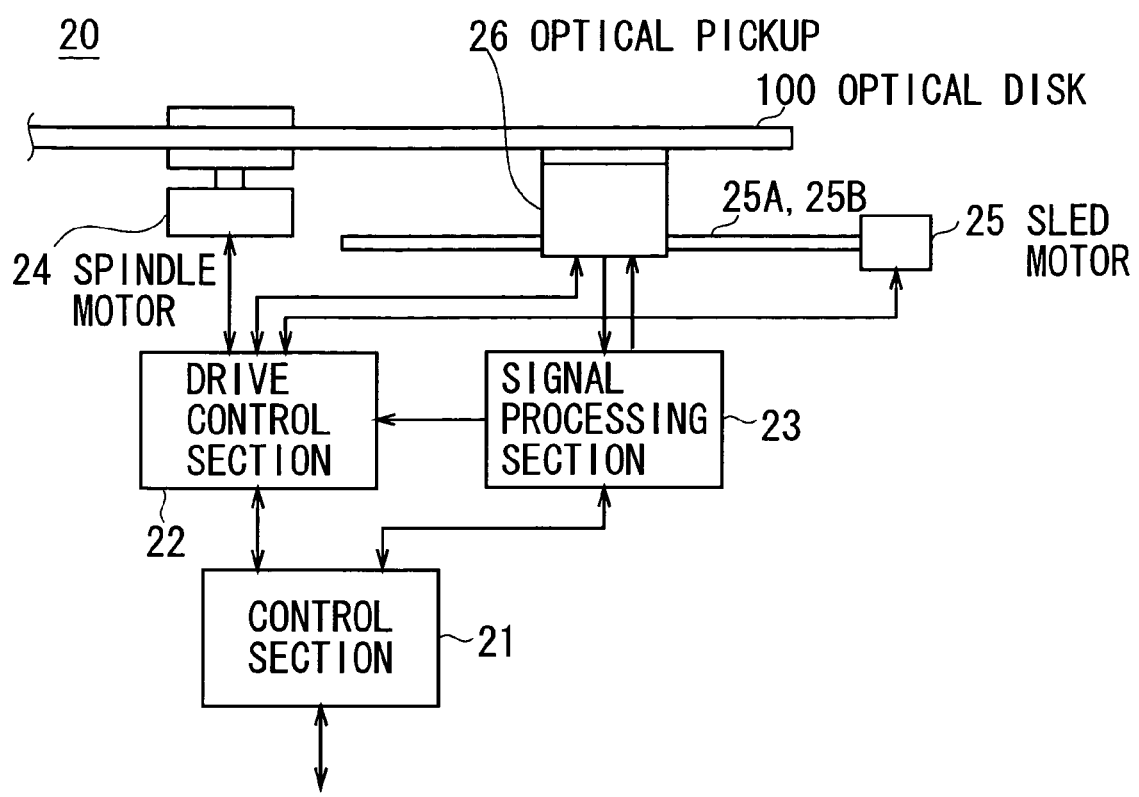
FIG. 5 is a schematic diagram illustrating the configuration of an optical disc device.

The following describes the optical disc device 20 for the above optical disc 100. As shown in FIG. 5, the optical disc device 20 includes a control section 21 that takes overall control of the device 20.

The control section 21 includes Central Processing Unit (CPU, not shown) as an integral part. The CPU reads out a basic program, an information recording program and other programs from Read Only Memory (ROM, not shown) and loads them onto Random Access Memory (RAM, not shown) to perform an information recording process and other processes.

For example, with the optical disc 100 put in the device 20, when the control section 21 receives an information recording command, a piece of recording information and a piece of recording address information from an external device or the like (not shown), the control section 21 supplies a drive command and a piece of recording address information to a drive control section 22 and a piece of recording information to a signal processing section 23. Incidentally, the piece of recording address information is a piece of address information representing an address of an area where the piece of recording information will be recorded: An address is allocated to each segment of the recording layer 101 of the optical disc 100.

The drive control section 22 follows the drive command and drives and controls a spindle motor 24 to rotate the optical disc 100 at a predetermined rotation speed. In addition, the drive control section 22 drives and controls the sled motor 25 to move an optical pickup 26 along motion shafts 25A and 25B in the radial direction of the optical disc 100 (i.e. toward the innermost part or the circumference) and put it under a position corresponding to the piece of recording address information.

The signal processing section 23 performs various types of signal processes, such as predetermined coding or modulation process, to the piece of recording information supplied to generate a recording signal, which is then supplied to the optical pickup 26.

The optical pickup 26, under the control of the drive control section 22 (FIG. 4), performs a focus control process and a tracking control process to focus the recording blue optical beam Lb1w on a track (also referred to as "target track") identified by the piece of recording address information on the recording layer 101 of the optical disc 100, and produces a recording mark RM corresponding to a recording signal supplied from the signal processing section 23 (described below).

When receiving from an external device (not shown) an information reproduction command and a piece of reproduction address information representing an address of an area where the piece of recording information is recorded, the control section 21 supplies a drive command to the drive control section 22 and a reproduction process command to the signal processing section 23.

In a similar way to when the information is recorded, the drive control section 22 drives and controls the spindle motor 24 to rotate the optical disc 100 at a predetermined rotation speed, and also drives and controls the sled motor 25 to move the optical pickup 26 to under a location corresponding to the piece of reproduction address information.

The optical pickup 26, under the control of the drive control section 22 (FIG. 4), performs a focus control process and a tracking control process to focus the reading blue optical beam Lb1r on a track (i.e. target track) identified by the piece of reproduction address information on the recording layer 101 of the optical disc 100, and emits a predetermined intensity of an optical beam. At this time, the optical pickup 26 detects the blue optical beam Lb2 from the recording mark RM of the recording layer 101 of the optical disc 100 and supplies to the signal processing section 23 a detection signal corresponding to the amount of light it has detected (described later).

The signal processing section 23 performs various types of processes, such as predetermined demodulation and decoding process, to the supplied detection signal, generates a piece of reproduced information, and supplies the piece of reproduced information to the control section 21. In response, the control section 21 transmits the piece of reproduced information to an external device (not shown).

In this manner, the control section 21 of the optical disc device 20 controls the optical pickup 26 to record information on the target mark positions in the recording layer 101 of the optical disc 100 and to reproduce information from the optical mark positions.

(3) Configuration of Optical Pickup

Figure 6:
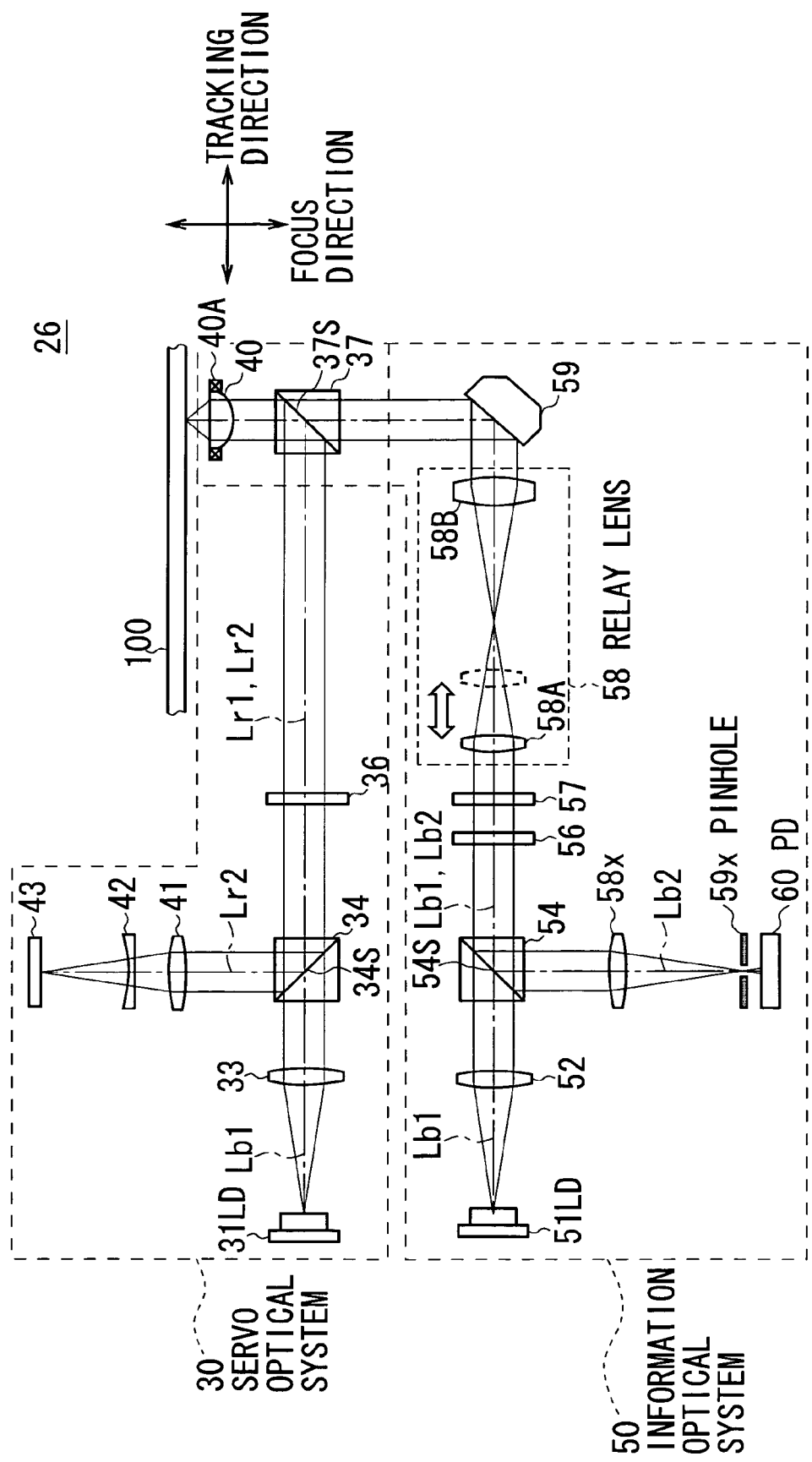
FIG. 6 is a schematic diagram illustrating the configuration of an optical pickup.

The following describes the configuration of the optical pickup 26. As shown in FIG. 6, the optical pickup 26 includes a servo optical system 30 for servo control and an information optical system 50 for reproducing or recording information.

The optical pickup 26 leads a servo beam emitted from a laser diode 31 (i.e. the red optical beam Lr1) to an objective lens 40 via the servo optical system 30, while leading the blue optical beam Lb1 emitted from a laser diode 51 (i.e. reading blue optical beam Lb1r or recording blue optical beam Lb1w) to the same objective lens 40 via the information optical system 50. The beams finally reach the optical disc 100.

(3-1) Optical Path of Red Optical Beam

Figure 7:
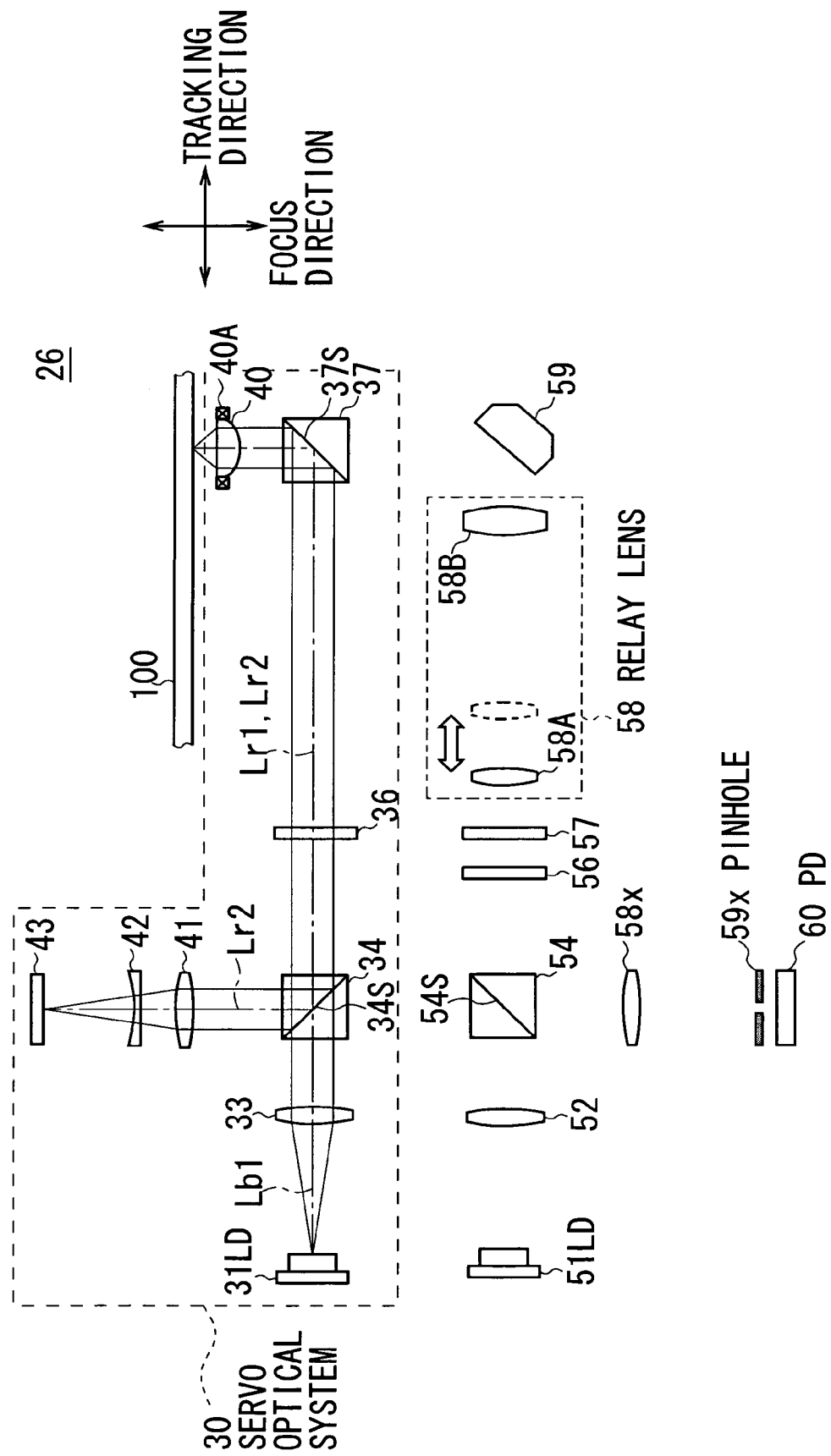
FIG. 7 is a schematic diagram illustrating an optical path of a red optical beam.

As shown in FIG. 7, the servo optical system 30 leads the red optical beam Lr1 to the optical disc 100 via the objective lens 40. The servo optical system 30 also leads the reflection of the red optical beam Lr1 from the optical disc 100, or the red optical beam Lr2, to a photodetector 43.

The laser diode 31 can emit the p-polarized red optical bam with a wavelength of around 660 nm. In reality, the laser diode 31, under the control of the control section 21 (FIG. 5), emits the predetermined intensity of divergent red optical beam Lr1 toward a collimator lens 33. The collimator lens 33 converts the red optical beam Lr1 from divergent light to collimated light, and leads it to a polarizing beam splitter 34.

The polarizing beam splitter 34 includes a reflection and transmission plane 34S which reflects or transmits the optical beam at a ratio depending on the polarized direction of the optical beam: The p-polarized optical beam is substantially totally transmitted through the reflection and transmission plane 34S while the s-polarized optical beam is substantially totally reflected by the plane 34S.

The polarizing beam splitter 34 substantially totally transmits the p-polarized red optical beam L1 therethrough, and leads it to a quarter wave length plate 36.

The quarter wave length plate 36 converts the red optical beam Lr1 from p-polarized light to left-handed circularly-polarized light, and leads it to a dichroic prism 37. The dichroic prism 37 includes a transmission and reflection plane 37S which reflects or transmits the optical beam according to the wavelength of the optical beam: The red optical beam Lr1 is reflected toward the objective lens 40.

The objective lens 40 collects the red optical beam Lr1 and emits the red optical beam Lr1 toward the reflection film 104 of the optical disc 100. At this time, as shown in FIG. 2, the red optical beam Lr1 passes through the base plate 102 and gets reflected by the reflection film 104. The reflection of the read optical beam Lr1 travels in the opposite direction, and becomes the counterclockwise polarized read optical beam Lr2.

After that, the red optical beam Lr2 is converted by the objective lens 40 to collimated light, and then reaches the dichroic prism 37. The dichroic prism 37 reflects the red optical beam Lr2 to the quarter wave length plate 36.

The quarter wave length plate 36 converts the right-handed circularly-polarized red optical beam Lr2 into the s-polarized red optical beam Lr2 and leads it to the polarizing beam splitter 34. The polarizing beam splitter 34 reflects the s-polarized red optical beam Lr2 toward a multi lens 41.

The multi lens 41 converges the red optical beam Lr2. After astigmatism is added by the cylindrical lens 42, the red optical beam Lr2 is emitted toward the photodetector 43.

By the way, in the optical disc device 20, the axial run-out of the rotating optical disc 100 could happen, and this may change the position of the target track relative to the objective lens 40.

Accordingly, in order to make the red-beam focal point Fr of the red optical beam Lr1 (FIG. 2) follow the target track precisely, the red-beam focal point Fr has to move in an approaching or departing direction with respect to the optical disc 100, i.e. focus direction (in a direction toward the innermost part of the optical disc 100) or a tracking direction (in a direction toward the circumference).

Accordingly, the objective lens 40 can be moved by a two-axis actuator 40A in the two-axial directions, or in the focus or tracking direction.

In the servo optical system 30 (FIG. 7), the optical position of each optical component is adjusted such that the in-focus state of the red optical beam Lr1 emitted to the reflection film 104 of the optical disc 100 after being collected by the objective lens 40 is reflected on the in-focus state of the red optical beam Lr2 received by the photodetector 43 after being collected by the multi lens 41.

Figure 8:
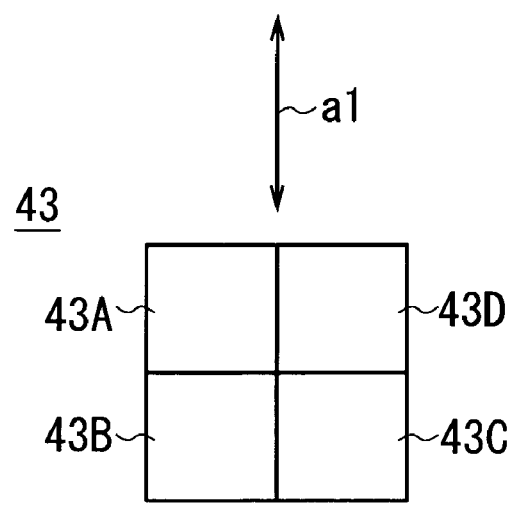
FIG. 8 is a schematic diagram illustrating the configuration of detection areas on a photodetector.

As shown in FIG. 8, one surface of the photodetector 43, onto which the red optical beam Lr2 is emitted, includes four detection sections 43A, 43B, 43C and 43D, an area divided into four in grid pattern. Incidentally, the direction indicated by arrow a1 (or the vertical direction in the diagram) corresponds to the traveling direction of the track when the read optical beam Lr1 is emitted toward the reflection film 104 (FIG. 3).

The detection sections 43A, 43B, 43C and 43D of the photodetector 43 partly detects the red optical beam Lr2, generates the detection signals SDAr, SDBr, SDCr and SDDr, which vary according to the amount of light they have detected, and then transmits them to the signal processing section 23 (FIG. 4).

The signal processing section 23 is designed to perform a focus control process employing the so-called astigmatic method. The signal processing section 23 calculates the focus error signal SFEs as follows:

$$SFEs = (SDAs + SDCs) - (SDBs + SDDs) \quad (1)$$

The signal processing section 23 then supplies the focus error signal SFEs to the drive control section 22.

This focus error signal SFEs represents a distance from the red-beam focal point Fr of the optical read beam Lr1 to the reflection film 104 of the optical disc 100.

In addition, the signal processing section 23 is designed to perform the tracking control process employing the so-called push-pull method. The signal processing section 23 calculates a tracking error signal STEr as follows:

$$STEs=(SDAs+SDDs)-(SDBs+SDCs) \qquad (2)$$

The signal processing section 23 supplies the tracking error signal STEr to the drive control section 22.

The tracking error signal STEr represents a distance from the red-beam focal point Fr to the target track of the reflection film 104 of the optical disc 100.

The drive control section 22 generates a focus drive signal SFDr from the focus error signal SFEs, and supplies the focus drive signal SFDr to the two-axis actuator 40A to perform a feedback control process (i.e. the focus control process) of the objective lens 40, by which the red optical beam Lr1 is focused on the reflection film 104 of the optical disc 100.

Moreover, the drive control section 22 generates a tracking drive signal STDr from the tracking error signal STEr, and supplies the tracking drive signal STDr to the two-axis actuator 40A to perform a feedback control process (i.e. the tracking control process) of the objective lens 40, in which the red optical beam Lr1 is focused on the target track of the reflection film 104 of the optical disc 100.

In this manner, the servo optical system 30 emits the red optical beam Lr1 to the reflection film 104 of the optical disc 100, and supplies the result of receiving the refection of the beam (or the red optical beam Lr2) to the signal processing section 23. In response, the drive control section 22 performs the focus control and tracking control processes of the objective lens 40 to focus the red optical beam Lr1 on the target track of the reflection film 104.

(3-2) Optical Path of Blue Optical Beam

Figure 9:
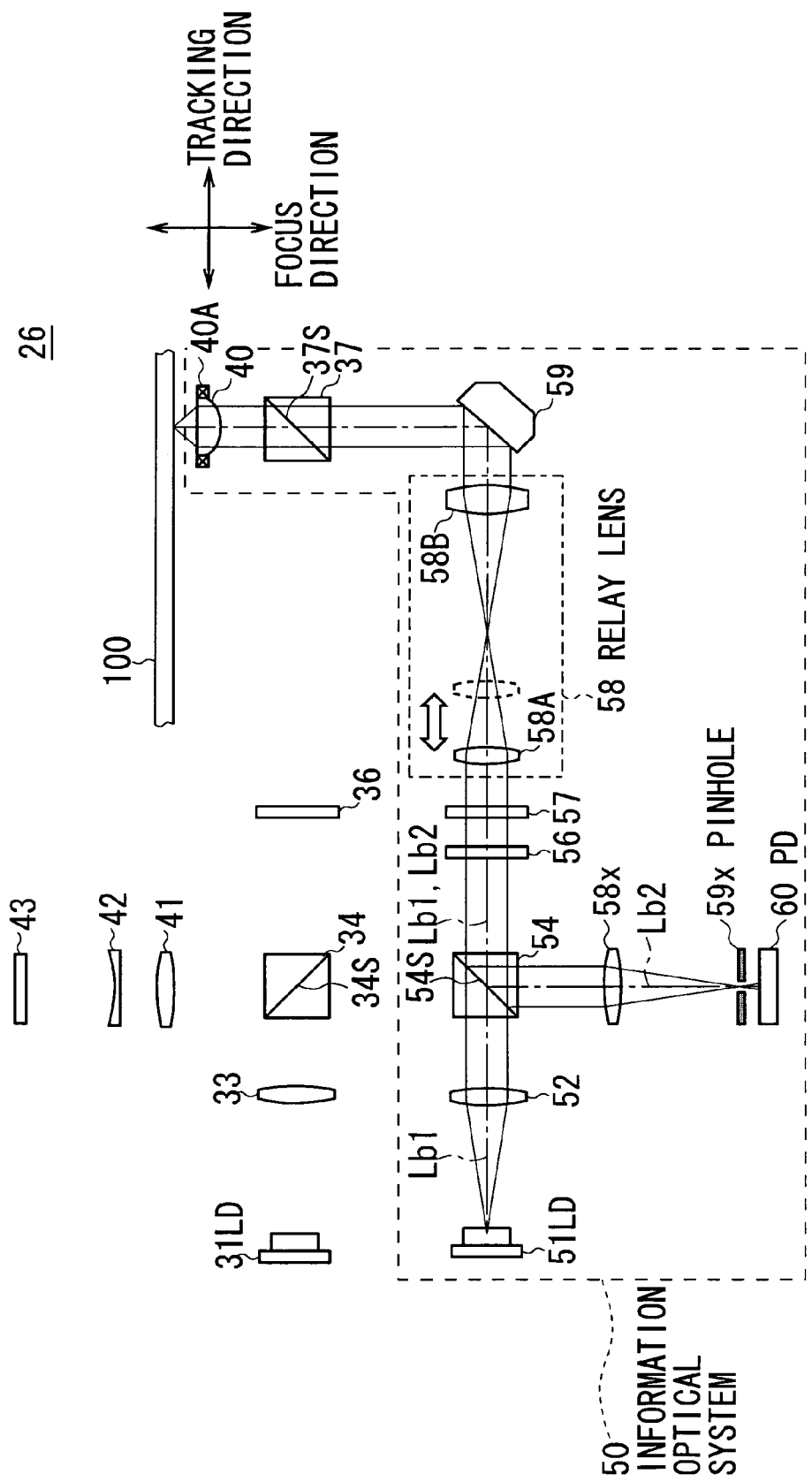
FIG. 9 is a schematic diagram illustrating the optical path of a blue optical beam.

On the other hand, as shown in FIG. 9 in which parts have been designated by the same reference numerals and symbols as the corresponding parts of FIG. 6, in the information optical system 50, the blue optical beam Lb1 emitted from the laser diode 51 passes through the objective lens 40 and then reaches the optical disc 100. The refection of the blue optical beam Lb1 from the optical disc 100, or the blue optical beam Lb2, is received by the photodetector 60.

The laser diode 51 can emit the blue laser beam with a wavelength of 405 nm. In reality, the laser diode 51, under the control of the control section 21 (FIG. 5) emits the predetermined intensity of the divergent blue optical beam Lb1 to a collimator lens 52. The collimator lens 52 converts the blue optical beam Lb1 from divergent light to collimated light, which is then supplied to a polarizing beam splitter 54.

The polarizing beam splitter 54 includes a reflection and transmission plane 54S which allows the optical beam to be reflected or transmitted depending on the polarized direction of the optical beam: For example, the p-polarized optical beam is substantially totally transmitted through the reflection and transmission plane 54S while the s-polarized optical beam is substantially totally reflected by the plane 54S.

The polarizing beam splitter 54 transmits the p-polarized blue optical beam Lb1 therethrough, and leads it to a quarter wave length plate 57 via Liquid Crystal Panel (LCP) 56 which corrects spherical aberration.

The quarter wave length plate 57 converts the blue optical beam Lb1 from p-polarized light to, for example, left-handed circularly-polarized light, and leads it to a relay lens 58.

A movable lens 58A of the relay lens 58 converts the blue optical beam Lb1 from collimated light to convergent light. The blue optical beam Lb1 is then converted into divergent light. Subsequently, the blue optical beam Lb1 is converted by a fixed lens 58B into convergent light and reaches a mirror 59.

Here, the movable lens 58A can be moved by an actuator (not shown) in the direction of the optical axis of the blue optical beam Lb1. In reality, the relay lens 58, under the control of the control section 21 (FIG. 5), controls the actuator to move the movable lens 58A in order to change the convergent state of the blue optical beam Lb1 emitted from the fixed lens 58B.

The mirror 59 reflects the blue optical beam Lb1 to invert the polarization direction of the circularly-polarized blue optical beam Lb1 (from left-handed circularly-polarized light to right-handed circularly-polarized light, for example). At the same time, the mirror 59 changes the traveling direction of the blue optical beam Lb1 toward the dichroic prism 37. The reflection and transmission plane 37S of the dichroic prism 37 transmits the blue optical beam Lb1 therethrough, and leads it to the objective lens 40.

The objective lens 40 collects the blue optical beam Lb1 and leads it to the optical disc 100. At this time, as shown in FIG. 2, the blue optical beam Lb1 passes through the base plate 102 and is focused in the recording layer 101.

Here, the position of the blue-beam focal point Fb of the blue optical beam Lb1 is determined depending on the convergent state of the beam when it is emitted from the fixed lens 58B of the relay lens 58. That is, the blue-beam focal point Fb moves inside the recording layer 101 in the focus direction according to the position of the movable lens 58A.

More specifically, the information optical system 50 is designed such that the traveling distance of the movable lens 58A is substantially proportional to the traveling distance of the blue-beam focal point Fb of the blue optical beam Lb1: For example, if the movable lens 58A moves 1 mm, the blue-beam focal point Fb of the blue optical beam Lb1 moves 30 μm.

In reality, in the information optical system 50, the control section 21 (FIG. 5) controls the position of the movable lens 58A to adjust the depth d1 of the blue-beam focal point Fb of the blue optical beam Lb1 inside the recording layer 101 of the optical disc 100 (i.e. adjusting the distance from the blue-beam focal point Fb to the reflection layer 104). In this manner, the control section 21 puts the blue-beam focal point Fb on the target mark position.

In that manner, the information optical system 50 emits the blue optical beam Lb1 via the objective lens 40 servo-controlled by the servo optical system 30 to align the tracking direction of the blue-beam focal point Fb of the blue optical beam Lb1 with the target mark position. Moreover, the information optical system 50 controls the position of the movable lens 58A of the relay lens 58 to adjust the depth d1 of the blue-beam focal point Fb in order to align the focus direction of the blue-beam focal point Fb with the target mark position.

And when the recording process of recording information on the optical disc 100 is performed, the blue optical beam Lb1 is collected by the objective lens 40 to the blue-beam focal point Fb, at which a recording mark RM is formed.

On the other hand, when the reproduction process of reproducing information from the optical disc 100 is performed, the reading blue optical beam Lb1r, which is collected to the blue-beam focal point Fb, is reflected at the recording mark RM if there is the recording mark RM at the blue-beam focal point Fb. The reflection of the reading blue optical beam Lb1r, or the blue optical beam Lb2, then enters the objective lens 40. At this time, the blue optical beam Lb2 has a counterclockwise polarized direction as a result of reflection by the recording mark RM, i.e. it was converted from right-handed circularly-polarized light to left-handed circularly-polarized light, for example.

On the other hand, if there is no recording mark RM at the blue-beam focal point Fb, the blue optical beam Lb1 diverges after being converged into the blue-beam focal point Fb. Subsequently, the blue optical beam Lb1 is reflected by the reflection film 104 and then enters the objective lens 40 as the blue optical beam Lb2. At this time, the blue optical beam Lb2 has a counterclockwise polarized direction as a result of reflection by the reflection film 104, i.e. it was converted from right-handed circularly-polarized light to left-handed circularly-polarized light, for example.

The objective lens 40 converges the blue optical beam Lb2 to a certain extent, and leads it to the dichroic prism 37. The dichroic prism 37 transmits the blue optical beam Lb2 therethrough and leads it to the mirror 59.

The mirror 59 reflects the blue optical beam Lb2 to invert the polarized direction of the circularly-polarized blue optical beam Lb2 (from the left-handed circularly-polarized light to the right-handed circularly-polarized light, for example), and also changes its traveling direction to lead it to the relay lens 58.

The relay lens 58 converts the blue optical beam Lb2 into collimated light, and leads it to the quarter wave length plate 57. The quarter wave length plate 57 converts the blue optical beam Lb2 from circularly-polarized light to linearly-polarized light (from right-handed circularly-polarized light to s-polarized light, for example), and leads it to the polarizing beam splitter 54 via the LCP 56.

A polarizing plane 54S of the polarizing beam splitter 54 reflects the s-polarized blue optical beam Lb2, and leads it to a multi lens 58x. The multi lens 58x collects the blue optical beam Lb2 and leads it to the photodetector 60 via a pinhole plate 59x.

Figure 10:
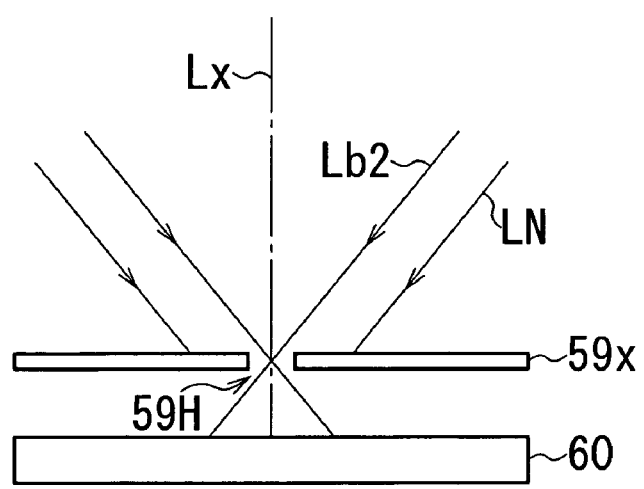
FIG. 10 is a schematic diagram illustrating how to separate the optical beam via a pinhole.

Here, as shown in FIG. 10, the pinhole plate 59x is positioned such that the focal point of the blue optical beam Lb2 collected by the multi lens 58x (FIG. 9) is formed in the hole section 59H. This allows the blue optical beam Lb2 to pass therethrough.

On the other hand, as shown in FIG. 10, the pinhole plate 59 can block the stray light LN, which has a different focal point, such as the reflection from the surface of the base plate 102 of the optical disc 100, from a recording mark RM at a different position or from the reflection film 104. As a result, for the photodetector 60, it is almost impossible to detect the intensity of the stray light LN.

As a result, without being affected by the stray light LN, the photodetector 60 generates a detection signal SDb according to the intensity of the blue optical beam Lb2, and then supplies it to the signal processing section 23 (FIG. 5).

In this case, the reproduced detection signal SDb precisely represents the information recorded on the optical disc 100 as the recording marks RM. Therefore, the signal processing section 23 performs predetermined processes, such as demodulation or decoding, to the reproduced detection signal SDb and then generates reproduced information. The signal processing section 23 supplies the reproduced information to the control section 21.

In that manner, the information optical system 50 receives the blue optical beam Lb2 from the optical disc 100 via the objective lens 38, and then supplies the result of receiving the beam to the signal processing section 23.

(4) Operation and Effect

In the optical disc device 20 with the above configuration, the optical pickup 26 emits via the objective lens 40 the blue optical beam Lb1, which is the equivalent of a first beam whose intensity is greater than or equal to a predetermined level, and the red optical beam Lr1, which is the equivalent of a second beam and whose wavelength is different from the blue optical beam Lb1, to the optical disc 100, which is the equivalent of an optical information recording medium on which information is recorded as the recording mark RM as a result of being exposed to the predetermined intensity of the blue optical beam Lb1; it moves the objective lens 40 such that the red optical beam Lr1 is focused on the reflection layer 104 that is formed on the optical disc 100 and at least partly reflects the red optical beam L1; it positions the blue-beam focal point Fb of the blue optical beam Lb1 a certain distance away from the red-beam focal point Fr of the red optical beam Lr1 in a direction of depth or a direction along which the objective lens 40 moves close to or away from the optical disc 100 by changing the convergence state of the blue optical beam Lb1; and it forms the blue-beam focal point Fb of the blue optical beam Lb1 at a target depth that is intended to be exposed to the blue optical beam Lb1.

In this manner, the optical pickup 26 can position the blue-beam focal point Fb of the blue optical beam Lb1 at the target mark position with respect to the reflection film 104, and thereby record information on the recording layer 101 of the optical disc 100 by forming the recording mark RM at the target mark position of the optical disc 100. Here, according to a typical method in which the combined two optical beams are emitted from the both sides of the optical disc 100 to form the holograms or the recording marks RM, it is difficult to stabilize the process of forming the recording marks RM because the recording marks RM are formed at places where the two optical beams are focused. By contrast, the optical pickup 26 just emits one blue optical beam Lb1 toward the target mark position of the optical disc 100. This stabilizes the process of forming the recording marks RM and also simplifies the structure of the optical pickup 26.

Moreover, in the optical pickup 26, a beam guiding section combines the blue optical beam Lb1 and the red optical beam Lr1 and leads them to the objective lens 40; it also makes the reflection of the blue optical beam Lb1, or the blue optical beam Lb2, travel along a first optical path the optical beam Lb1 has traveled (i.e. it travels the mirror 59, the relay lens 58, the quarter wave length plate 57, the LCP 56 and the polarizing beam splitter 54 in that order), while making the reflection of the red optical beam Lr1 from the reflection film 104, or the red optical beam Lr2, travel along a second optical path the red optical beam Lr1 has traveled (i.e. it travels the quarter wave length plate 36 and the polarizing beam splitter 34). Subsequently, first and second separating sections separates the blue optical beam Lb2 and the red optical beam Lr2 from the first optical path and the second optical path, and leads them to the photodetector 60, which receives the blue optical beam Lb2, and to the photodetector 43, which receives the red optical beam Lr2.

In this manner, the optical pickup 26 can make the blue optical beam Lb2 travel the same path as the blue optical beam Lb1 does. This compensates the change of the convergence state of the blue optical beam Lb1. Therefore, the change of the convergence state may not need to be reflected on the blue optical beam Lb2 received by the photodetector 60. Accordingly, the optical pickup 26 may not need an optical component to compensate for the change of the convergence state. This could simplify the structure.

Furthermore, the optical pickup 26 uses, as a beam guiding section, the dichroic prism 37 that substantially totally reflects the red optical beam Lr1 and substantially totally transmits the blue optical beam Lb1 therethrough. The optical pickup 26 also uses, as a first beam separating section and a second beam separating section, the polarizing beam splitters 34 and 54 that separate the optical beams according to the difference of polarization direction.

Therefore, the optical pickup 26 can use the same objective lens 40 to emit the blue optical beam Lb1 and the red optical beam Lr1 to the optical disc 100. In addition, according to the difference of polarization direction, the optical pickup 26 can separate the blue optical beam Lb2 and the red optical beam Lr2 from the blue optical beam Lb1 and the red optical beam Lr1 to lead them to the photodetectors 60 and 40. This can reduce the number of components of the servo optical system 30 and the information optical system 50.

Moreover, the optical disc 100 includes: the recording layer 101 that is made by exposing the photo-reactive uncured resin 101A containing a organometallic compound to the predetermined initialization beam Lp1 in photo-reaction by which the uncured resin 101A is cured, that forms a recording mark RM after the organometallic compound changes in quality due to an increase in temperature around the blue-beam focal point Fb of the recording blue optical beam Lb1$w$ (or a predetermined recording beam) collected when information is recorded, and that allows information to be reproduced from the blue optical beam Lb2 generated as a result of being exposed to the predetermined reading blue optical beam Lb1$r$; and the reflection film 104 that at least partly reflects the red optical beam Lr1 whose wavelength is different from the recording blue optical beam Lb1$w$, the red optical beam Lr1 emitted for positioning the recording blue optical beam Lb1$w$ at a certain position on the recording layer 101.

Accordingly, the optical disc 100 allows the optical disc device 20 to perform a simple process, or just emitting the recording blue optical beam Lb1$w$ to the recording layer 101, to make the recording mark RM. This can simplify the structure of the optical disc 20.

According to the above configuration, the optical disc device 20 moves the objective lens 40 such that the red optical beam Lr1 is focused on the reflection film 104 that at least partly reflects the red optical beam Lr1 whose wavelength is different from the blue optical beam Lb1, the reflection film 104 formed in the optical disc 100 on which the recording mark RM is formed as a result of being exposed to the blue optical beam Lb1; and it emits the blue optical beam Lb1 via the objective lens 40 and focuses the blue optical beam Lb1 on a different position in the direction of depth from the red-beam focal point Fr of the red optical beam Lr1 by changing the convergence state of the blue optical beam Lb1 to form the recording mark RM at a certain target mark position with respect to the reflection film 104. Thus, an optical pickup, an optical information recording device, an optical information recording method, an optical information reproduction device and an optical information reproduction method are capable of the stable reading and recording of information with the simple structure, and an optical information recording medium is capable of the stable reading and recording of information.

(5) Other Embodiments

In the above-noted embodiment, by changing the organometallic compound in quality, the optical disc device 20 forms the recording mark RM on the recording layer 101. However the present invention is not limited to this. On the recording layer 101 whose refractive index changes as a result of being exposed to the beam, the holograms may have been previously formed overall; the optical disc device emits the blue optical beam Lb1 to the recording layer 101 and destroys the holograms to make the recording mark RM.

Moreover, in the above-noted embodiment, the reflection film 104 substantially totally reflects the blue optical beam. However the present invention is not limited to this. The reflection film could be replaced with a reflection and transmission film that allows the blue optical beam to be reflected and transmitted at a certain ratio (1:1, for example): Even if there are scratches on the base plate 102, the blue optical beam Lb1 emitted to the base plate 103 can read information.

Figure 11:
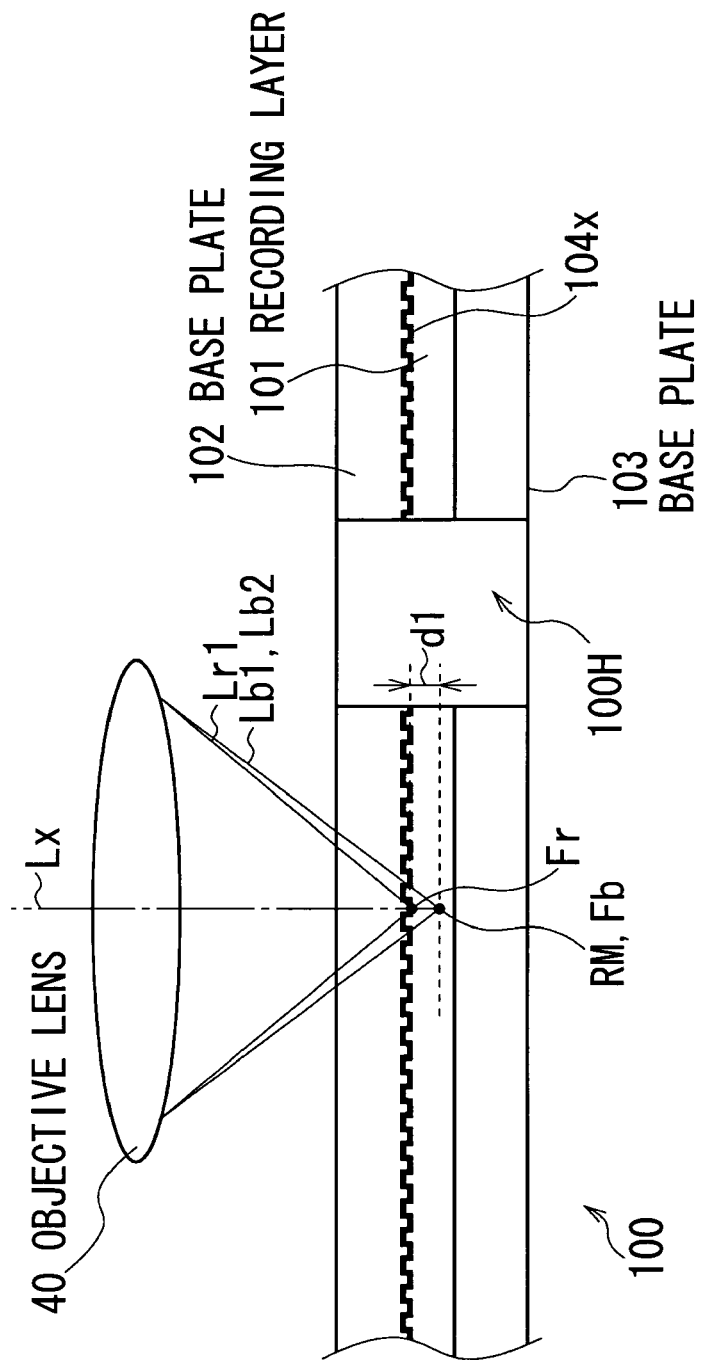
FIG. 11 is a schematic diagram illustrating the configuration of an optical disc according to another embodiment of the present invention (1)

Furthermore, in the above-noted embodiment, the reflection film 104 is between the recording layer 101 and the base plate 103, which is on the side opposite to the objective lens 104. However the present invention is not limited to this. For example, as shown in FIG. 11, a reflection film 104$x$ may be between the recording layer 101 and the base plate 102, which is on the side of the objective lens 40.

In this case, for example, the reflection film 104$x$ is a reflection and transmission film that reflects 100 percent of a certain wavelength of beam used for servo control of the objective lens 40 (i.e. the red optical beam) while allowing 100 percent of another wavelength of beam used for recording and reproduction (i.e. the blue optical beam) to be transmitted therethrough. Accordingly, the red optical beam Lr2 is generated as a result of the reflection of the red optical beam Lr1, and the blue optical beam Lb1 is focused on the target mark position.

Figure 12:
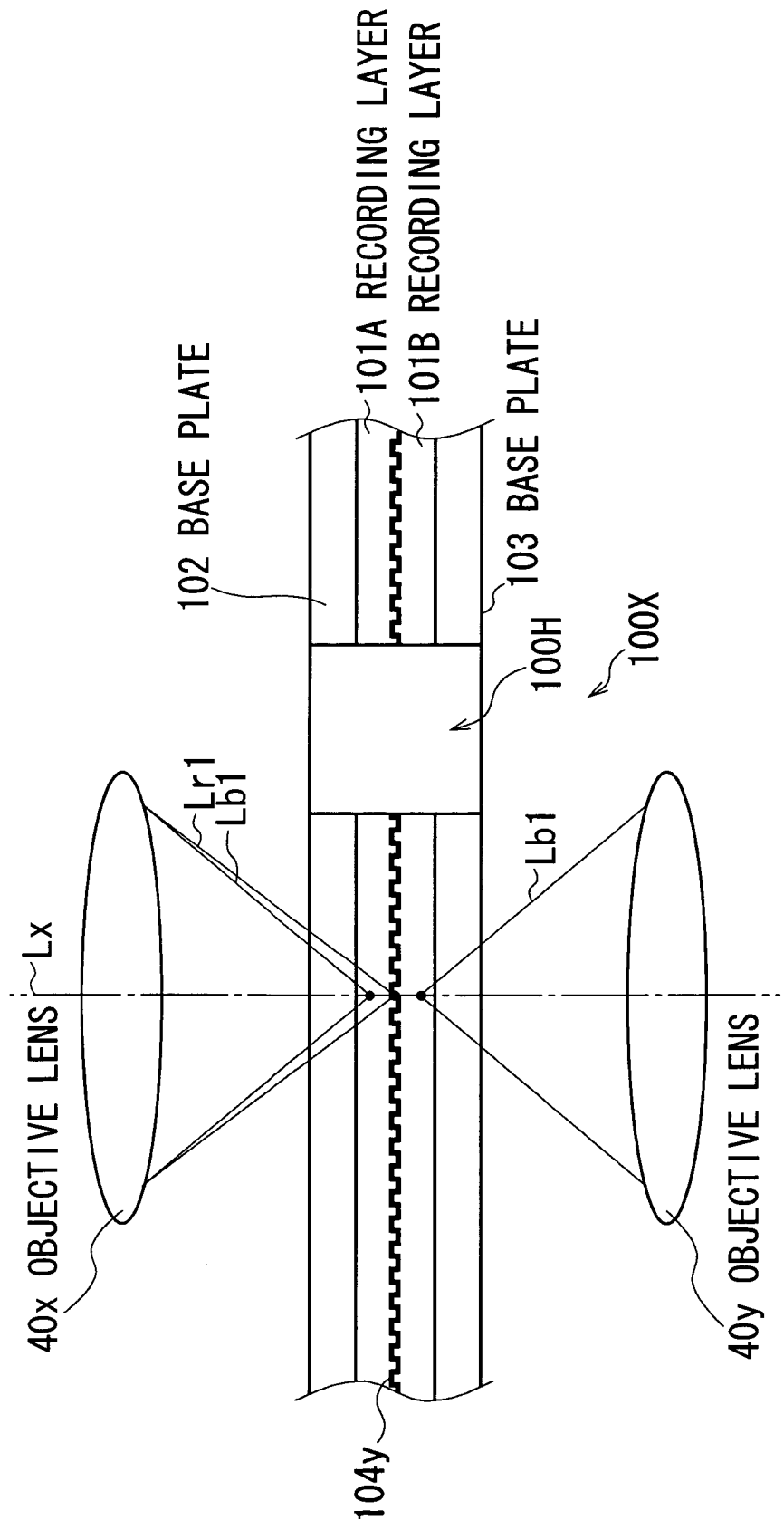
FIG. 12 is a schematic diagram illustrating the configuration of an optical disc according to another embodiment of the present invention (2).

Alternatively, as shown in FIG. 12, two recording layers 101A and 101B may be formed in the optical disc 100X, and a reflection film 104$y$ may be formed at the boundary between the recording layers 101A and 101B. In this case, the reflection film 104$y$ may reflect all the beams, while the optical disc device 20 may have two objective lenses 40$x$ and 40$y$; the blue optical beams Lb1 are emitted to the two target mark positions in the recording layers 101A and 101B via the two objective lenses 40$x$ and 40$y$.

At this time, the optical disc device 20 only uses one red optical beam Lr1 to perform the tracking control process of the objective lenses 40$x$ and 40$y$ at the same time. As a result, the two blue optical beams Lb1 are focused on the same track on the recording layers 101A and 101B at the same time. For the sake of convenience, the blue optical beams Lb2 are omitted in the figure.

In that manner, the optical disc device 20 performs either two recording processes or two reproduction processes in parallel by emitting two optical beams Lb via the two objective lenses 40$x$ and 40$y$. This can increase the speed of reading and recording information on the optical disc 100.

In addition, the optical disc device 20 may control the objective lenses 40$x$ and 40$y$ separately by using two red optical beams Lr1 (not shown); it can focus two blue optical beams Lb1 at different tracks on the recording layers 101A and 101B.

Furthermore, if the reflection film 104$y$ of the optical disc 100X is a transmission and reflection film 104$z$ (not shown) to reflect around 100 percent of the red optical beam Lr1 and about 50 percent of the blue optical beam Lb1, the recording mark RM can be formed on the recording layers 101A and 101B by just emitting the blue optical beam Lb1 toward the base plate 102.

In this optical disc 100X, the reflection film 104$y$ is formed around the center of the optical disc 100X and the both sides of the reflection film 104$y$ are symmetrically configured. Therefore, the physical characteristics, such as thermal shrinkage, are the same at the both sides, preventing the optical disc 100X from being bent.

Furthermore, in the above-noted embodiment, the optical pickup 26 has the structure illustrated in FIG. 6. However, the present invention is not limited to this. The number of optical components, their arrangement and types can be changed: Instead of the quarter wave length plate 36 and 57, only one quarter wave length plate may be provided between the polarizing beam splitter 37 and the objective lens 40; or the arrangement of the servo optical system 30 and the information optical system 50 may be changed, replacing the dichroic prism 37 with another dichroic prism that transmits the red optical beam Lr1 while reflecting the blue optical beam Lb1.

Furthermore, in the above-noted embodiment, the recording mark RM is formed on the disc-shaped optical disc 100. However the present invention is not limited to this. The recording mark RM may be formed on a cubic (or rectangular) optical information recording medium.

Furthermore, in the above-noted embodiment, the recording mark is produced as a result of change of the organometallic compound in the recording layer 101. However the present invention is not limited to this. For example, the recording mark is produced by forming a cavity inside the recording layer 101 by increasing the temperature around the focal point above the glass transition point.

Furthermore, in the above-noted embodiment, the optical pickup 26 (an optical pickup) includes the objective lens 40 (an objective lens), the two-axis actuator 40A (an objective lens drive section), and the relay lens 58 (a focal point shifting section). However, the present invention is not limited to this. The optical pickup may have a different structure, with the objective lens, the objective lens drive section and the focal point shifting section.

Furthermore, in the above-noted embodiment, the optical disc device 20 (an optical information recording device) includes the objective lens 40 (an objective lens), the two-axis actuator 40A (an objective lens drive section), and the relay lens 58 (a focal point shifting section). However, the present invention is not limited to this. The optical information recording device may have a different structure, with the objective lens, the objective lens drive section and the focal point shifting section.

Furthermore, in the above-noted embodiment, the optical disc device 20 (an optical information reproduction device) includes the objective lens 40 (an objective lens), the two-axis actuator 40A (an objective lens drive section), the relay lens 58 (a focal point shifting section), and the photodetector 60 (a beam receiving section). However, the present invention is not limited to this. The optical information recording device may have a different structure, with the objective lens, the objective lens drive section, the focal point shifting section and the beam receiving section.

Furthermore, in the above-noted embodiment, the optical disc 100 (an optical information recording medium) includes the recording layer 101 (a recording layer) and the reflection film 104 (a reflection layer). However, the present invention is not limited to this. The optical information recording medium may have a different structure, with the recording layer and the reflection layer.

The above method can be applied to an optical disc device that records and reproduces a large amount of information, such as video and audio content, on a recording medium, such as an optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a beam guiding section to combine a first beam and a second beam to lead the first and second beam to an objective lens, and lead a first reflection beam, representing information, or a reflection of the first beam from an optical information recording medium, along a first optical path that the first beam traveled and a second reflection beam, or a reflection of the second beam from a reflection layer, along a second optical path that the second beam traveled;
a first beam receiving section to receive the first reflection beam based on the first reflection beam;
a first beam separating section to separate the first reflection beam from the first optical path and lead the first reflection beam to the first beam receiving section;
a second beam receiving section to receive the second reflection beam; and
a second beam separating section to separate the second reflection beam from the second optical path and lead the second reflection beam to the second beam receiving section, wherein
the objective lens drive section drives the objective lens according to the result of receiving the beam by the second beam receiving section;
the objective lens to collect the first beam and the second beam whose wavelength is different from the first beam and emit the first and second beam toward the optical information recording medium on which information can be recorded as a recording mark as a result of being exposed to the first beam whose intensity is greater than or equal to a predetermined level;
the objective lens drive section to drive the objective lens to focus the second beam on the reflection layer formed on the optical information recording medium, the reflection layer at least partly reflecting the second beam; and
the focal point shifting section to change a convergence state of the first beam to position a first focal point of the first beam a certain distance away from a second focal point of the second beam in the direction of depth along which the objective lens moves close to or away from the optical information recording medium in order to place the first focal point of the first beam at a target depth that should be exposed to the first beam.

2. The optical pickup according to claim 1, wherein
the beam guiding section includes a dichroic film that reflects the first or second beam, depending on the wavelength, while transmitting the first or second beam that was not reflected therethrough.

3. The optical pickup according to claim 1, wherein
the first and second beam separating section is a polarizing beam splitter that reflects or transmits light according to a difference of polarization direction.

4. The optical pickup according to claim 3, wherein
the focal point shifting section is a relay lens that includes a fixed lens and a movable lens that moves along an optical axis of the first beam.

5. The optical pickup according to claim 2, further comprising
a quarter wave length plate provided between the objective lens and the beam guiding section, the quarter wave length plate converting linearly-polarized first and second beams into circularly-polarized first and second beams.

6. The optical pickup according to claim 2, further comprising:
   a first quarter wave length plate provided between the first beam separating section and the beam guiding section; and
   a second quarter wave length plate provided between the second beam separating section and the beam guiding section, wherein
      the first and second quarter wave length plates convert linearly-polarized first and second beams into circularly-polarized first and second beams.

7. The optical pickup according to claim 1, further comprising
   a pinhole plate followed by the first beam receiving section, the pinhole plate removing stray light reflected at a different position from the focal point of the first beam.

8. An optical information recording device comprising:
   an objective lens to collect a first beam and a second beam whose wavelength is different from the first beam and emit the first and second beam toward an optical information recording medium on which information can be recorded as a recording mark as a result of being exposed to the first beam whose intensity is greater than or equal to a predetermined level;
   an objective lens drive section to drive the objective lens to focus the second beam on a reflection layer formed on the optical information recording medium, the reflection layer at least partly reflecting the second beam;
   a focal point shifting section to change a convergence state of the first beam to position a focal point of the first beam a certain distance away from a focal point of the second beam in the direction of depth along which the objective lens moves close to or away from the optical information recording medium in order to place the focal point of the first beam at a target depth where the recording mark should be recorded;
   a beam guiding section to combine the first beam and the second beam to lead the first and second beam to the objective lens, and lead a first reflection beam representing the information, or the reflection of the first beam from the optical information recording medium, along a first optical path that the first beam traveled and a second reflection beam, or the reflection of the second beam from the reflection layer, along a second optical path that the second beam traveled;
   a first beam receiving section to receive the first reflection beam based on the first reflection beam;
   a first beam separating section to separate the first reflection beam from the first optical path and lead the first reflection beam to the first beam receiving section;
   a second beam receiving section to receive the second reflection beam; and
   a second beam separating section to separate the second reflection beam from the second optical path and lead the second reflection beam to the second beam receiving section, wherein
   the objective lens drive section drives the objective lens according to the result of receiving the beam by the second beam receiving section.

9. An optical information recording method, comprising:
   using an objective lens to collect a first beam and a second beam whose wavelength is different from the first beam and emit the first and second beam toward an optical information recording medium on which information can be recorded as a recording mark as a result of being exposed to the first beam whose intensity is greater than or equal to a predetermined level;
   driving the objective lens to focus the second beam on a reflection layer formed on the optical information recording medium, the reflection layer at least partly reflecting the second beam;
   changing a convergence state of the first beam to position a focal point of the first beam a certain distance away from a focal point of the second beam in the direction of depth along which the objective lens moves close to or away from the optical information recording medium in order to place the focal point of the first beam at a target depth where the recording mark should be recorded
   combining the first beam and the second beam to lead them to the objective lens, and lead a first reflection beam representing the information, or the reflection of the first beam from the optical information recording medium, along a first optical path that the first beam traveled and a second reflection beam, or the reflection of the second beam from the reflection layer, along a second optical path that the second beam traveled;
   receiving the first reflection beam based on the first reflection beam at a first beam receiving section;
   separating the first reflection beam from the first optical path and leading the first reflection beam to the first beam receiving section;
   receiving the second reflection beam at a second beam receiving section; and
   separating the second reflection beam from the second optical path and leading the second reflection beam to the second beam receiving section, wherein
   driving the objective lens is performed in accordance to the result of receiving the beam by the second beam receiving section.

10. An optical information reproduction device comprising:
   an objective lens to collect a first beam and a second beam whose wavelength is different from the first beam and emit the first and second beam toward an optical information recording medium on which information can be recorded as a recording mark as a result of being exposed to the first beam whose intensity is greater than or equal to a predetermined level;
   an objective lens drive section to drive the objective lens to focus the second beam on a reflection layer formed on the optical information recording medium, the reflection layer at least partly reflecting the second beam;
   a focal point shifting section to change a convergence state of the first beam to position a first focal point of the first beam a certain distance away from a second focal point of the second beam in the direction of depth along which the objective lens moves close to or away from the optical information recording medium to place the first focal point of the first beam at a target depth that should be exposed to the first beam;
   a beam receiving section to receive the reflection of the first beam from the record mark;
   a beam guiding section to combine the first beam and the second beam and to lead them to the objective lens, and lead a first reflection beam representing the information, or the reflection of the first beam from the optical information recording medium, along a first optical path that the first beam traveled and a second reflection beam, or the reflection of the second beam from the reflection layer, along a second optical path that the second beam traveled;
   a first beam receiving section to receive the first reflection beam based on the first reflection beam;

a first beam separating section to separate the first reflection beam from the first optical path and lead the first reflection beam to the first beam receiving section;

a second beam receiving section to receive the second reflection beam; and a second beam separating section to separate the second reflection beam from the second optical path and lead the second reflection beam to the second beam receiving section, wherein the objective lens drive section drives the objective lens according to the result of receiving the beam by the second beam receiving section.

11. An optical information reproduction method, comprising:

using an objective lens to collect a first beam and a second beam whose wavelength is different from the first beam and emit the first and second beam toward an optical information recording medium on which information can be recorded as a recording mark as a result of being exposed to the first beam whose intensity is greater than or equal to a predetermined level;

driving the objective lens to focus the second beam on a reflection layer formed on the optical information recording medium, the reflection layer at least partly reflecting the second beam;

changing a convergence state of the first beam to position a first focal point of the first beam a certain distance away from a second focal point of the second beam in the direction of depth along which the objective lens moves close to or away from the optical information recording medium in order to place the focal point of the first beam at a target depth that should be exposed to the first beam;

receiving the reflection of the first beam from the recording mark;

combining the first beam and the second beam to lead them to the objective lens, and leading a first reflection beam representing the information, or the reflection of the first beam from the optical information recording medium, along a first optical path that the first beam traveled and a second reflection beam, or the reflection of the second beam from the reflection layer, along a second optical path that the second beam traveled;

receiving the first reflection beam based on the first reflection beam at a first beam receiving section;

separating the first reflection beam from the first optical path and leading the first reflection beam to the first beam receiving section;

receiving the second reflection beam at a second beam receiving section; and separating the second reflection beam from the second optical path and leading the second reflection beam to the second beam receiving section, wherein driving the objective lens is performed in accordance to the result of receiving the beam by the second beam receiving section.

12. An optical information recording medium comprising:

a plurality of recording layers piled up upon one another in a direction of a thickness of one recording layer;

the one recording layer made by exposing a photo-reactive uncured resin containing a organometallic compound to a predetermined initialization beam in photo-reaction by which the uncured resin is cured, the one recording layer forming, when information is recorded, a recording mark after the organometallic compound changes in quality due to an increase in temperature around the focal point of a predetermined recording beam collected, while allowing information to be reproduced from a returning beam generated as a result of being exposed to a predetermined reading beam; and a reflection layer that at least partly reflects a servo beam whose wavelength is different from the recording beam, the servo beam emitted for positioning the recording beam at a certain position on the one recording layer.

13. The optical information recording medium according to claim 12, wherein the one recording layer is cured as a result of being exposed to the initialization beam in photo-reaction while the organometallic compound is photo-chemically changed by the initialization beam.

14. The optical information recording medium according to claim 12, further comprising two protective layers between which there are the one recording layer and the reflection layer.

15. The optical information recording medium according to claim 12, wherein the reflection layer totally reflects the recording beam.

16. The optical information recording medium according to claim 12, wherein the reflection layer has concave and convex portions that are used to identify location along a direction parallel to the reflection layer of the optical information recording medium.

17. The optical information recording medium according to claim 12, wherein the recording layer includes two layers between which there is the reflection layer.

18. The optical information recording medium according to claim 12, wherein when the information is recorded, the recording layer produces a cavity to form the recording mark.

* * * * *